United States Patent
Naab et al.

[11] Patent Number: 5,646,793
[45] Date of Patent: Jul. 8, 1997

[54] LASER BEAM DEVICE FOR MOTOR VEHICLES

[75] Inventors: Karl Naab, Woerth; Wolfgang Hahn, Schwabhausen, both of Germany

[73] Assignee: Bayerische Motoren Werke AG, Munich, Germany

[21] Appl. No.: 359,466

[22] Filed: Dec. 19, 1994

[30] Foreign Application Priority Data

Dec. 17, 1993 [DE] Germany .................. 43 43 092.9

[51] Int. Cl.$^6$ .................. B60Q 1/00; G08G 1/16; G01C 21/02
[52] U.S. Cl. .................. 359/896; 340/435; 340/903; 250/206.1
[58] Field of Search .................. 359/896; 340/901, 340/903, 942, 435; 250/206.1

[56] References Cited

U.S. PATENT DOCUMENTS

| | | | |
|---|---|---|---|
| 5,166,681 | 11/1992 | Bottesch et al. | 340/933 |
| 5,293,162 | 3/1994 | Bachalo | 340/905 |
| 5,321,255 | 6/1994 | Kakinami et al. | 250/222.1 |

FOREIGN PATENT DOCUMENTS

| | | |
|---|---|---|
| 2 576 126 | 7/1986 | France . |
| 23 27 186 | 12/1974 | Germany . |
| 36 16 930 | 12/1986 | Germany . |
| 36 27 972 | 2/1988 | Germany . |
| 37 01 340 | 7/1988 | Germany . |
| 40 28 788 | 3/1992 | Germany . |
| 41 23 056 | 1/1993 | Germany . |
| 43 02 527 | 8/1993 | Germany . |
| WO 89/06808 | 7/1989 | WIPO . |

OTHER PUBLICATIONS

Japan Abstract No. JP6148330, vol. 18, No. 454 (P-1791), Aug. 24, 1994.

*Primary Examiner*—Paul M. Dzierzynski
*Assistant Examiner*—Darren E. Schuberg
*Attorney, Agent, or Firm*—Evenson, McKeown, Edwards & Lenahan P.L.L.C.

[57] ABSTRACT

In the case of a laser beam device for motor vehicles, including at least one transmitter, at least one receiver and a resolving lens system for laser beams by which an area situated in front of the motor vehicle can be scanned while being divided into several explored areas, a central area is adjoined on both sides by marginal areas whose explored areas overlap with that of the central area.

3 Claims, 1 Drawing Sheet

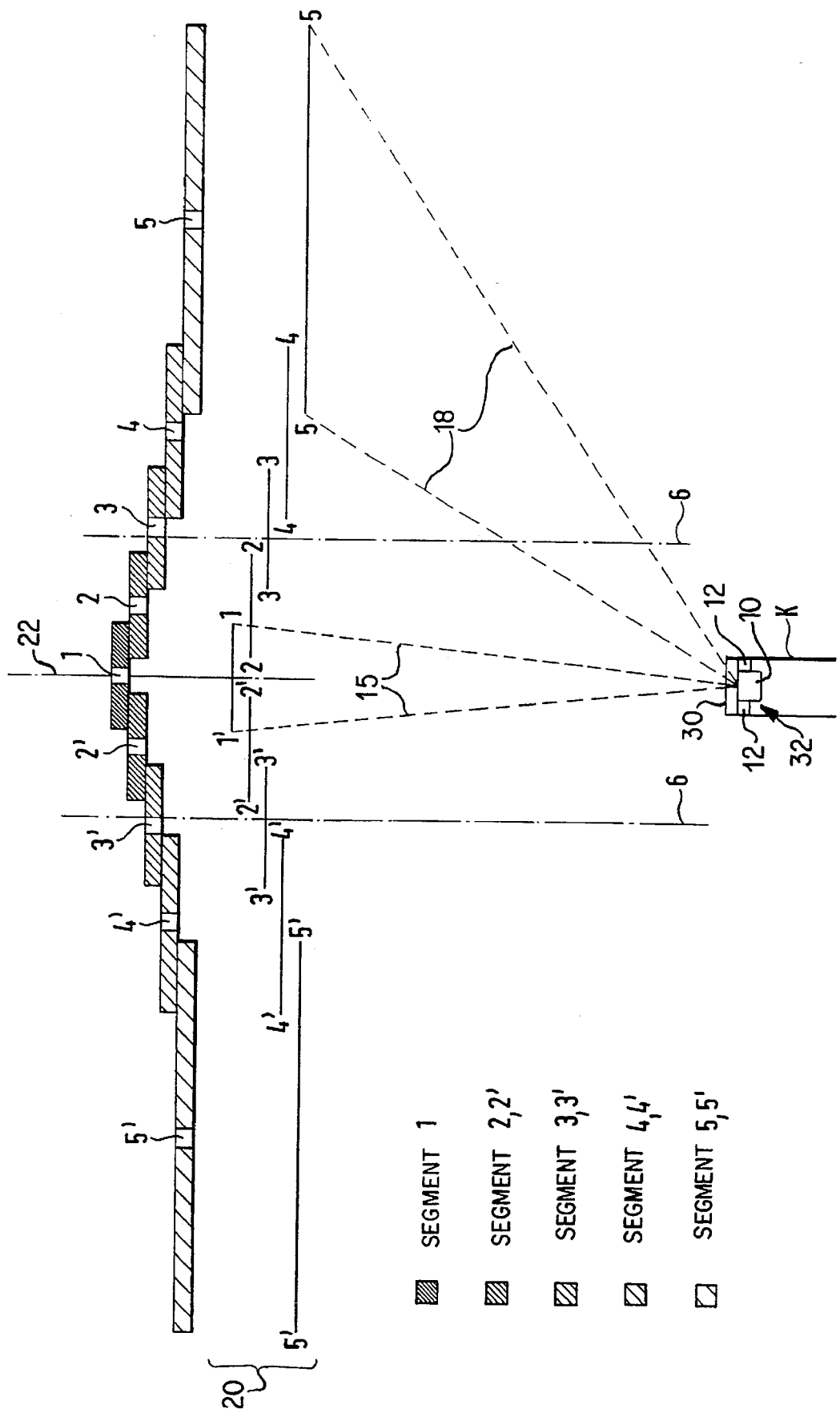

LASER BEAM DEVICE FOR MOTOR VEHICLES

BACKGROUND AND SUMMARY OF THE INVENTION

This invention relates to a laser beam device for motor vehicles including at least one transmitter, at least one receiver and a resolving lens system for laser beams, by means of which an area situated in front of the motor vehicle can be scanned while being divided into several explored areas.

In the case of known devices of this type, adjacent explored areas adjoin one another in a seamless manner as in German Patent document DE 37 01 340 A1. Alternatively, the adjacent explored areas have blanking gaps as described in German Patent document DE 40 28 788 A1; that is, the explored areas are positioned so as to fill gaps and have areas which are situated in-between and cannot be seen.

In order to obtain a relatively large azimuthal resolution area, it is required, in the case of the known devices, to provide a plurality of channels as in German Patent document DE 37 01 340 A1 or, as the result of the blanking gaps, problems arise with respect to recognizing narrow objects as in German Patent document DE 40 28 788 A1.

There is therefore needed a laser beam device of the abovementioned type which achieves a high resolution with minimal constructive expenditures.

These needs are met according to the present invention by a laser beam device for motor vehicles including at least one transmitter, at least one receiver and a resolving lens system for laser beams, by means of which an area situated in front of the motor vehicle can be scanned while being divided into several explored areas. Marginal areas adjoin a central area on both sides. The explored areas of these marginal areas overlap that of the central area.

If the central area and the two marginal areas have, for example, a field of view of 3°, and mutually overlap by one third respectively, an angular resolution of 2•2° for the marginal areas and 3•1° for the central area in the case of a total field of view of 7° is obtained. In the case of a separate arrangement of explored areas, as described in the first-mentioned document above, these geometrical conditions can only be achieved using five areas and, therefore, in a pertaining analysis circuit having five channels. The advantage of avoiding blanking gaps achieved in comparison to the second document mentioned above becomes noticeable particularly in the case of obstacles which are situated in the proximity of the central area, that is, when the motor vehicle is driving straight ahead, specifically in the area of the driving corridor.

In a further embodiment of the basic idea of the present invention, the field of view can be enlarged without gaps and with a good azimuthal resolution if the beam geometry is properly selected such that the marginal areas are adjoined by outer areas whose explored areas overlap with that of the respective marginal area but not with that of the central area. In the case of movement of the object across the individual channels, there is the possibility of precisely following this movement and, thus, predicting with high precision the probable course of the path of movement. Such movement will take place, for example, when an object passes through several explored areas because of the movement of the motor vehicle. By referring to the self-movement of the motor vehicle, the self-movement of the object can be determined and a dangerous situation which arises can be prevented by corresponding countermeasures. At a minimum, its danger can at least be reduced. Such countermeasures may be carried out in an active manner, that is, for example, by an automatic reduction of the driving torque of the internal-combustion engine or the initiating of a braking operation, or in a passive manner, by use of an acoustic or visual reference to the imminent danger.

The basic idea of the invention, that is, achieving a relatively high (fine) resolution by the relatively large solid angle of the individual explored area with the simultaneous overlapping of adjacent explored areas, may also be used for providing the explored area with an overall large size. For this purpose, the field of view of the outer area is larger than that of the marginal area. This has the aim of keeping the solid angle larger in the outer area than for the explored areas in the center or in the marginal area. Since the movement of an object with respect to the motor vehicle can be detected at low expenditures, as indicated above, the dangerousness of an object can also be recognized in the case of a correspondingly large solid angle for the outer area. If this object, for example, does not enter the adjacent marginal area, there is probably no danger of collision.

To take this outer area into account is particularly advantageous when the speed of the motor vehicle is relatively low, for example, 30 km/h. The outer area is important only for such low speeds, while it does not have to be taken into account at high speeds, for example, 100 km/h. This also applies specifically when the outer area has a solid angle which is significantly larger than the solid angle of the central area or of the two marginal areas. 6° may be useful as the value for this solid angle and may be advantageous with respect to the indicated example. The energy which is beamed into this outer area may be identical to the energy which reaches the central area. Thus, the energy apportioned to the solid-angle unit will be less. As the result of the shorter distance of the objects which are of interest—objects at a large distance outside the central area do not have to be taken into account—the received backscattered energy remains approximately identical to that of objects in the central area which are at a larger distance.

Other objects, advantages and novel features of the present invention will become apparent from the following detailed description of the invention when considered in conjunction with the accompanying drawings.

BRIEF DESCRIPTION OF THE DRAWING

The single FIGURE is a block diagram illustration of the principles according to the present invention.

DETAILED DESCRIPTION OF THE DRAWING

The single FIGURE illustrates the principle of the invention of the laser beam device 32 for motor vehicles. Using a resolving lens system 30, the area in front of a motor vehicle K is divided into different explored areas 20. These explored areas are irradiated by laser beams of a laser source 10. Receivers 12 operate in that they detect an object situated in the respective explored area because of the reflected radiation. Such irradiation and receiving devices are well known as conventional technology to those of ordinary skill in the art.

The alignment of the receivers 12 and of the laser beams is such that the explored areas 20 overlap at their margin. A central explored area is formed whose boundary is indicated by the numbers 1/1 and by interrupted line 15. The area is situated symmetrically with respect to the axis of symmetry 22. It is situated in the extension of the respective path of the motor vehicle. The central area 1/1 is adjoined by two marginal areas whose boundaries are indicated by 2'/2 and 2'/2'. The solid angles for the central area and for the two marginal areas are selected to be 3° respectively. The overlapping of the central area with the two marginal areas is to be one third respectively, that is, a solid angle of 1°.

The two marginal areas are adjoined by two outer areas which have the numbers 3/3 and 3'/3'. The solid angle of these areas is selected to be 6°. Here also, an overlapping takes place between the two adjacent areas 2'/2, 3'/3 and 2/2', 3/3' of 1° respectively. An area 4/4 and 4'/4', which is situated even farther to the outside, as well as an extreme area 5/5 (interrupted line 18) and 5'/5' with a beam angle of 12° and 24° with an overlapping of 2° and 3° result in a total explored area encompassing a beam angle of approximately 80°. In this case, the beam angle becomes larger the farther the respective explored area is away from the center axis 0 (reference 22).

The different areas are illustrated so that their dimensions are situated transversely to the axis of symmetry 22 at a distance of 50 m as a line assumed as an example (for example, 3'13 3') and as a bar segment (corresponding to segment 3'). For reasons of clarity, the mutually overlapping representations are shown behind one another. Dash-dotted lines 6 show the driving corridor of the vehicle. Only objects situated in the driving corridor are considered critical, i.e., their position can be recognized as a result of the transit time of the reflected light.

The movement of an object with respect to the explored areas can thus be followed without any gaps occurring. In this case, the transition from one explored area to the other can be detected without any problem not only because of the change of the explored area but also as a result of the existence in the overlapping area of the two adjacent explored areas. Despite the relatively large width of the individual explored areas, the resolution is relatively high because, for example, the area around the center axis has a resolution of 3•1°. This is adjoined by a resolution of 1, 3, and 2° for the explored area 2/2 and 2'/2' at the transition from the preceding explored area to the explored area which is situated farther to the outside. An object can thus be detected in its movement with respect to the vehicle relatively without gaps. The danger of a collision as well as the actual size of the object can be easily detected. This results in a high degree of safety.

The illumination of the explored areas may take place in a rigid manner, that is, by using a corresponding number of transmitters and receivers. As an alternative, it is also possible to screen the entire explored area using a transmitter-receiver unit. The arrangement of the individual explored areas is obtained by a suitable time control. When a minimal beam angle of, for example, 3° is assumed, in the case of a central alignment (central explored area) and in the case of a relative deviation by +/−2°, the two marginal areas are explored. The corresponding situation applies to the other areas, in which case the beam expansion takes place via suitable optical devices.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Laser beam device for motor vehicles, comprising:

a laser source arranged in the motor vehicle for generating laser beams;

a resolving lens system coupled with the laser beams for dividing an area in front of the motor vehicle into several explored areas, each of said explored areas being irradiated by different ones of said laser beams having beam angles; and at least one receiver arranged in the motor vehicle for receiving reflected radiation;

wherein marginal areas of the several explored areas adjoin a central area of the several explored areas on both sides thereof, said marginal areas overlapping the central area; and wherein outer areas of the several explored areas, having a larger field of view than that of the marginal areas, said larger field of view created by larger beam angles, adjoin said marginal areas, said outer areas being explored only at low speeds of the motor vehicle.

2. Laser beam device according to claim 1, wherein said outer areas have explored areas which overlap with that of the respective marginal area but not with the central area.

3. Laser beam device according to claim 1, wherein said laser source includes a plurality of transmitters, each of which emits a rigid laser beam for irradiating one of said explored areas.

* * * * *